United States Patent Office 3,249,510
Patented May 3, 1966

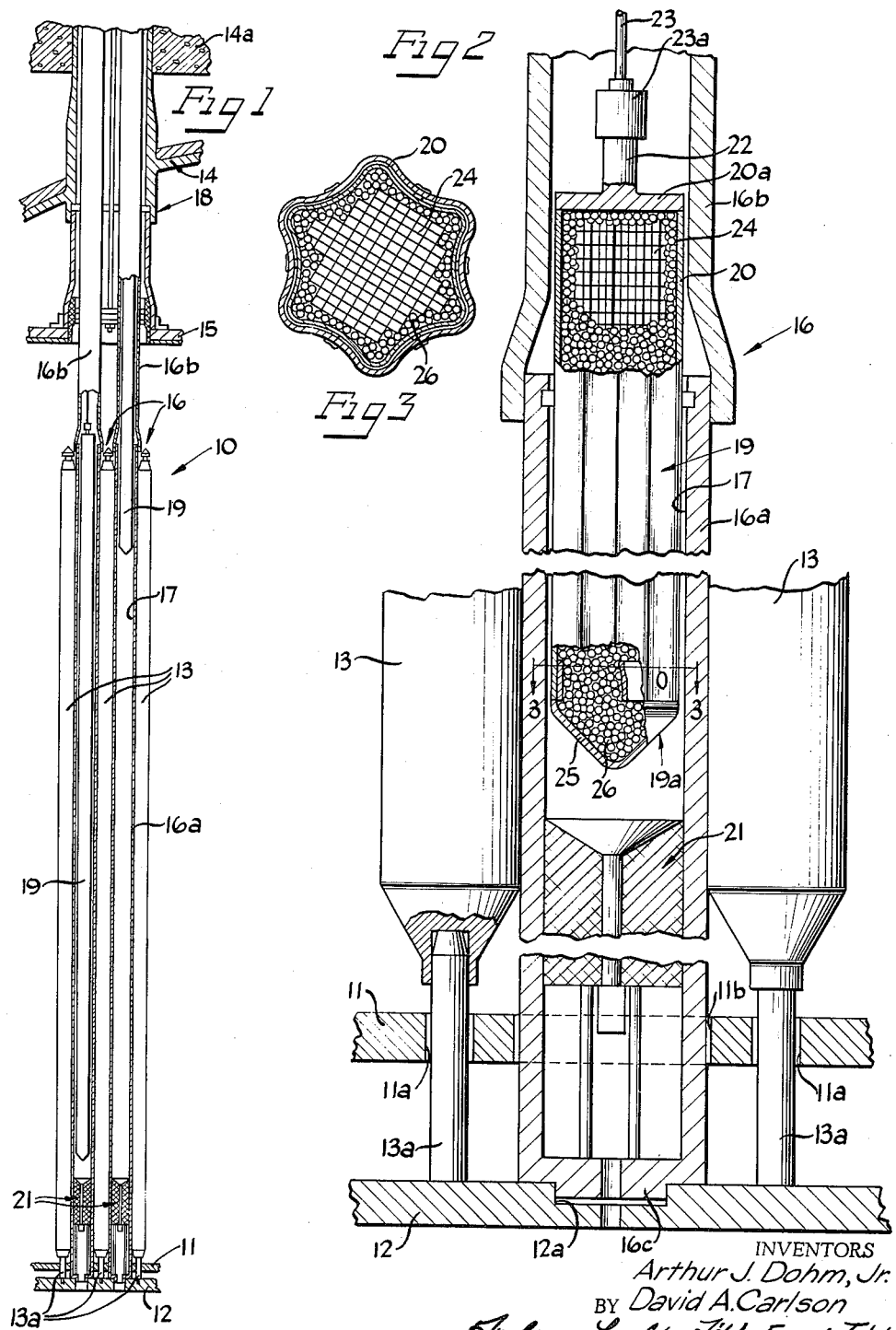

3,249,510
SHUTDOWN APPARATUS FOR NUCLEAR REACTORS
Arthur J. Dohm, Jr., Solana Beach, and David A. Carlson, Poway, Calif., assignors to General Dynamics Corporation, New York, N.Y., a corporation of Delaware
Filed Aug. 5, 1963, Ser. No. 300,037
7 Claims. (Cl. 176—86)

This invention relates to nuclear reactors and more particularly to emergency shutdown apparatus for nuclear reactors.

Nuclear reactors generally include a core which contains a quantity of fissionable material or fuel. The fissionable material is ordinarily distributed through the core in vertically disposed tubes and a sufficient quantity is provided to insure the necessary reactivity to sustain a nuclear chain reaction at a preselected power level. Control rods are also provided in the core to control and regulate the power level at which the reactor operates. These control rods comprise a material which is capable of absorbing neutrons thereby enabling a selective decrease or increase of the neutron flux in the core so that the power level of the reactor can be controlled.

It is also normal practice in nuclear reactor design to include auxiliary rods containing absorber material which during operation of the reactor are maintained in a withdrawn position from the core. These auxiliary rods include sufficient neutron-absorbing material to absorb a substantial portion of the neutrons emitted by fission of the reactor fuel and are mounted so that each can be advanced into the core in an emergency situation and effect the curtailment of the chain reaction.

Obviously it is necessary that the operability of these auxiliary rods (commonly referred to as "scram rods") be insured. It is also necessary that the insertion thereof into the core be automatically triggered whenever the power level of the reactor exceeds a predetermined safe level. To accomplish these two ends, various mechanical and electro-mechanical systems have been devised to accomplish automatic "scramming" operations. Although these automatic "scramming" systems have proven suitable in some applications, these systems are generally rather complex and add substantially to the cost of the nuclear reactor.

When an emergency condition occurs in a reactor resulting in an excess power level being reached, accompanying adverse conditions may also develop which can preclude the "scramming" operation from being fully effective. In this connection, it is possible that the "scram rods" may not be able to be inserted into the core because of some disruption in the structural make-up thereof.

Accordingly, it is the prime object of the present invention to provide an improved emergency shutdown apparatus for a nuclear reactor.

Still another object of the present invention is to provide an improved shutdown apparatus that can effect the automatic emergency shutdown of a reactor wherein employed without the necessity of movement thereof relative to the reactor core.

A further object of the present invention is to provide an improved shutdown apparatus for a nuclear reactor which can be readily employed to perform the aforementioned emergency shutdown function without materially increasing the cost of the reactor provided therewith.

Other objects and advantages of the present invention will become apparent from the following detailed description when considered in conjunction with the accompanying drawing wherein:

FIGURE 1 is a fragmentary representation of a portion of a nuclear reactor core including a preferred embodiment of the improved shutdown apparatus of the present invention;

FIGURE 2 is an enlarged fragmentary view of a control rod assembly forming the apparatus shown in FIGURE 1; and FIGURE 3 is a cross-sectional view taken generally along the line 3—3 of FIGURE 2.

In general, one preferred embodiment of the improved shutdown apparatus of the present invention contemplates one or more control rod assemblies which are adapted for vertical movement within the core of a nuclear reactor from a location above the core. Each of the control rod assemblies includes an external housing that serves as a confining enclosure for a filler of a suitable neutron absorber material. The neutron absorber material is maintained within the housing by a fusible member which is suitably connected to the lower extremity thereof. The fusible member is at least partially fabricated of a material which can readily withstand safe reactor core temperatures. However, the fusible member is susceptible to melting should an unsafe temperature develop within the core requiring an emergency termination of the chain reaction. Accordingly, irrespective of the location of the control rod with respect to the core or the existence of conditions that may preclude the insertion thereof fully within the core, the neutron absorber material discharges from the housing and into the core to thereby curtail the chain reaction when the fusible member melts.

It should be understood that a control rod assembly comprising the preferred embodiment of the emergency shutdown apparatus of the present invention is suitable for use with any number of nuclear reactors wherein the control rods can be inserted and withdrawn from a location above the reactor core. However, it should be understood that different reactor types might preferably employ a plurality of these control rod assemblies so that the chain reaction taking place therein can be adequately controlled and positively terminated. Moreover, for purposes of clarity, the fragmentary illustration in the drawings of the significant portion of a reactor core wherein such a control rod assembly or a plurality of assemblies would be typically employed does not depict the control rod drive mechanism, the reactor shielding structure, the coolant circulating means and other conventional components of a reactor that form no part of the present invention.

Referring now to FIGURE 1, there is disclosed a fragmentary portion of a typical nuclear reactor core 10, that includes a horizontally disposed thermal shield 11, a core support plate 12, which is mounted in parallel spaced relation to and beneath the thermal shield 11, and a plurality of vertically extending fuel elements 13. Support pins 13a for each of the fuel elements 13 extend upwardly from the core support plate 12 and through suitably proportioned apertures 11a in the thermal shield.

In this connection, the fuel elements are mounted on the support pins 13a so that the fuel material carried thereby is maintained in the central enclosed region of the reactor core that is confined within a generally vertically extending pressure vessel 14. As shown, an upper insulated shield plate 15 is mounted within the pressure vessel 14 and extends horizontally across the vessel in spaced relation to central region of the core. In a conventional manner, a reflector (not shown) is mounted within the pressure vessel so as to surround this central region of the core, and the pressure vessel 14 is constructed to withstand high pressure and high temperature conditions created therein.

As shown, a plurality of dual piece guide tubes 16, which are fabricated of a material resistant to the environmental conditions within the reactor core and which define cylindrical control rod guide channels 17, are mounted within the core 10 in a preselected configuration. More particularly, each of the guide tubes 16 includes a lower guide tube portion 16a and an upper guide tube portion 16b. The upper guide tube portion 16b is constructed to mate with the portion 16a and extends from the pressure vessel through the cover provided therefor and into a housing 18 for a control rod drive unit (not shown), a portion of which is confined within a concrete shield 14a provided about the pressure vessel.

The lower guide tube portions 16a are each positioned adjacent a cluster of fuel elements 13 and each has a lower generally cylindrical support portion 16c that projects from the lower apertured end plate thereof. This projecting support portion 16c is positioned within a suitably proportioned recess 12a in the core support plate 12 so that a coolant circulating aperture provided in the end plate of the lower guide tube portion 16a communicates with a similarly proportioned aperture provided in the recessed portion 12a of the support plate 12.

When the lower guide tube portion 16a is so supported, each extends upwardly through a suitably proportioned aperture 11b in the thermal shield 11, and the upper open end portion of each is aligned with the upper extremities of the surrounding fuel elements. At this location, the flared lower end of the upper guide tube portion 16b (FIGURE 2) mates with the upper extremity of the lower guide tube portion that is aligned therewith. Consequently each mating pair of guide tube portions 16a and 16b provides a continuous guide channel 17 that extends through the pressure vessel cover and into the control rod drive unit housing 18.

One each of a plurality of control rod assemblies, generally designated by the numeral 19, is mounted for selective upward and downward movement within each of the guide channels 17. In this connection, each of the illustrated control rod assemblies includes an elongated, hollow housing 20 having a generally fluted cross section, as shown in FIGURE 3, and a tapered lower end position 19a. The fluted housings 20 are formed with a major diameter that is slightly smaller than the inner diameter of the mated dual piece guide tubes 16. This fluted configuration of the housing 20 allows coolant to be circulated through the aligned coolant circulating apertures provided at the lower ends of the guide tube portions 16a and across the surface of the control rod assemblies located therein. In addition, the housings 20 have a length which allows the control rod assemblies 19 to be situated adjacent the fuel bearing portions of the fuel elements 13 without contacting conventional shock absorber assemblies 21, one of which is provided within each lower guide tube portion 16a above the aligned coolant circulating aperture provided therein.

To facilitate the selective upward and downward advance of the control rod assemblies 19 within the channel defining dual piece guide tubes 16, a connector or lifting knob 22 is secured to the upper end plate 20a of the fluted housing 20. In a conventional manner, the connector is designed to be positively engaged and gripped by a cable attachment 23a that is secured to the lower extremity of a suitable lifting cable 23. The lifting cable 23 is actuated in response to the operation of the control rod drive unit mounted within the housing 18. The upper end plate 20a and the fluted side walls of each of the elongated housings 20 are sufficiently thick to withstand the various forces which are applied thereto during operation of the reactor without rupturing.

As shown in FIGURES 2 and 3, the hollow central portion of each fluted housing 20 is filled with a filler of a suitable neutron absorber material (e.g., boron carbide in graphite). The major portion of the filler of neutron absorber material is preferably in the form of small bricks 24 which are carefully laid together and stacked within the fluted hollow housing 20. The bricks 24 are made in square, rectangular, tetrahedron, or other form, or combinations thereof, to obtain a minimum void volume in the fluted housing 20. More particularly, the tapered lower end portion 19a of each of the control rod assemblies 19 is a rounded hollow cone-like fusible end plug 25 that is secured (e.g. by rivets) to the lower end of the fluted housing 20. The hollow portion of the end plug is preferably filled with a plurality of pellets or shot 26 of neutron absorber material that provide a base layer for the bricks 24 that are stacked within the housing 20. In addition, a plurality of the pellets or shot 26 is provided about the stacked bricks 24 so that the entire fluted housing 20 is filled by neutron absorber material, and void spaces within the housing are minimized.

Preferably, the entire tapered end plug 25, which confines the neutron absorber material within the fluted housing 20, is fabricated of a suitable temperature responsive fusible alloy such as silver-manganese. This material is structurally sound at safe reactor operating temperatures but melts when the ambient temperature to which it is exposed goes above a preselected maximum temperature. This preselected maximum temperature corresponds to an abnormal reactor power level and is indicative of a reactor malfunction. Although this alloy is particularly suitable for use as the fusible end plug 25, other materials with suitable melting points and mechanical properties may also be employed. Moreover, rather than the entire end plug 25 being fabricated of a fusible material, the central portion thereof could be formed of temperature resistant material and the upper peripheral section which is riveted to the fluted housing 20, could be fabricated of the fusible material.

In either instance, however, when the preselected maximum temperature is exceeded, the fusible portion thereof melts thereby discharging the absorber material from the central portion of the fluted housings 20 and into the control rod guide channels 17. Since the control rod guide channels in which the control rod assemblies 19 move are larger in volume than the fluted housings 20, it is preferred that the neutron absorber material increase in void volume after falling into the control rod guide channels in order to fill the guide channels to approximately the top of the reactor core. The utilization of a stacked structure of bricks in the fluted housings insures that a maximum guide channel volume will be filled when the absorber material is discharged from the fluted housings and falls in random fashion into the lower guide tube portion 16a, thereby increasing the effectiveness of the neutron absorber material in shutting down the reactor.

During normal operation of a reactor utilizing the emergency shutdown apparatus of the present invention, the control rod assemblies 19 are normally positioned at the approximate location of the assembly shown to the right in FIGURE 1 (i.e., withdrawn from the core with only the lower end thereof positioned in the lower guide tube portions 16a). Should an emergency situation arise whereby the power level of the reactor becomes excessive, the temperature within the core rises to an extremely high, unsafe temperature. Although this emergency condition may be accompanied by structural changes or failures in the core structure so that the control rod assemblies 19 cannot be fully inserted within the core, this power surge is still curtailed. More particularly, after the temperature has exceeded the melting temperature of the fusible material, the end plug 25 of each of the assemblies 19 melts thereby opening the lower end of the fluted housings 20.

Accordingly, the bricks 24 and pellets 26 of absorber material confined within each of the housings 20 is discharged by gravity force into the corresponding channel 17 which would otherwise be occupied by the control rod assembly. Since the major portion of the neutron absorber material consists of the bricks 24 that accumulate in random fashion within the guide channels 17, the maximum volume of each guide channel is filled and an effective shutdown operation is realized. If desired, a suitable spring biased end member (not shown) can be provided within each fluted housing 20 adjacent the inner surface of the upper end plate 20a to insure the discharge of the absorber material after the restraining end plug 25 has melted away from the lower end thereof.

Inasmuch as each of the control rod assemblies 19 is individually responsive to an unsafe temperature rise within the reactor core wherein employed, the possibility of a high temperature condition occurring in one region of the core without corrective action taking place is eliminated. That is, any local abnormal temperature increase which might lead to an uncontrolled power level increase throughout the core is inhibited by the release of the absorber material confined within the control rod assembly positioned adjacent this location.

From the foregoing it should be apparent that the present invention provides an improved control means for effecting the emergency shutdown of a reactor. In addition, the shutdown operation effected by the control rod assemblies is effected irrespective of structural failures in the core and takes place without the intervening delay which is normally incident to the attempted positioning of "scram rods" or the like within the core and similar emergency measures. Moreover, since each of the channel defining dual piece guide tubes 16 is removable from the core structure, the discharge of the absorber material does not result in the core structure being rendered permanently unuseable. That is, subsequent to an emergency release of absorber material as outlined above, and after a suitable safe duration of time, the individual lower guide tube portions 16a, into which absorber material has been discharged, can be removed and reconditioned for subsequent use or replaced by similar guide tube structures.

It should be understood that the foregoing is merely illustrative of the invention. Various modifications in the structural features of the control rod assemblies can be devised by those skilled in the art without deviating from the invention, various features of which are set forth in the accompanying claims.

What is claimed is:
1. In a nuclear reactor including a reactor core, a control rod assembly which comprises an elongated housing adapted to be vertically moved within and relative to the core of the reactor, said housing having a hollow central portion and an open lower end communicating therewith, a filler of neutron absorbing material disposed within said hollow central portion, and an end plug connected to the lower open end of said housing for releasably confining the filler within the hollow central portion thereof, said end plug being at least partially fabricated of a fusible material that melts when the core temperature exceeds a preselected maximum temperature to allow the filler of neutron absorber material to be discharged from said housing through said lower end.

2. A control rod assembly for a nuclear reactor which comprises an elongated fluted housing formed of a temperature resistant material, said housing defining an elongated enclosure having an open end portion communicating therewith, a filler of neutron absorbing material disposed within the enclosure defined by said housing, and a fusible end plug connected to the open end portion of said housing for releasably maintaining the filler of neutron absorbing material within said enclosure, said fusible end plug being susceptible to melting when the temperature of a reactor wherein said control rod assembly is employed exceeds a preselected maximum temperature thereby allowing said filler of neutron absorbing material to be released from said housing through said end portion.

3. A control rod assembly for a nuclear reactor including a reactor core having at least one control rod guide tube provided therein for receiving said control rod assembly, which control rod assembly comprises a hollow elongated housing formed of a temperature resistant material and being proportioned to fit within the guide tube provided by the reactor core, said housing defining an elongated enclosure having an open end portion communicating therewith, a filler of neutron absorbing material disposed within the enclosure defined by said housing, said filler of neutron absorber material including a symmetrical arrangement of elements formed of neutron absorbing material, and a fusible end plug connected to the open end portion of said housing for releasably maintaining the filler of neutron absorbing material within said enclosure, said fusible end plug being susceptible to melting when the temperature of the reactor core exceeds a preselected maximum temperature thereby allowing said filler of neutron absorbing material to be released from said housing, said symmetrically arranged elements of neutron absorber material being thereby randomly discharged into the core and effectively increasing in volume and thereby filling a maximum volume within the guide tube of the reactor core.

4. A control rod for a nuclear reactor, said control rod comprising a vertically movable housing having a hollow portion and an open lower end portion in communication with said hollow portion, a filler including a plurality of small discrete elements comprised at least in part of neutron-absorbing material, said filler being disposed within said hollow portion, and a fusible end plug connected over the open lower end portion of said housing for releasably maintaining said filler in said hollow portion.

5. In a nuclear reactor including a reactor core, a control rod assembly which comprises an elongated housing adapted to be vertically moved within and relative to the core of the reactor, said housing having a hollow central portion and an open lower end communicating with said central portion, a filler comprising a plurality of small discrete elements comprised at least in part of neutron-absorbing material, said filler being disposed within said hollow central portion, and an end plug connected over said open lower end for releasably maintaining said filler within said central portion, said end plug being at least partially fabricated of a fusible material that melts when the core temperature exceeds a preselected minimum temperature to allow said filler to be dischargd from said housing through said lower end.

6. A control rod assembly as called for in claim 5, but where said small discrete elements of neutron-absorbing material are proportioned so that said filler is capable of readily flowing through an opening substantially smaller in size than said lower end of said housing, whereby said filler may be effectively discharged down into the reactor core despite structural deformation of the reactor core, said housing, or both.

7. Nuclear reactor structure comprising:
 (a) vertical tube closed at its lower end and removably supported in the core of a nuclear reactor, and
 (b) a control rod assembly comprising an elongated housing adapted to be moved vertically in and relative to said tube, said housing having a hollow central portion and an open lower end communicating with said central portion, a filler of neutron-absorbing material in the form of small discrete elements disposed within said central portion, and an end plug connected to the lower end of said housing for releasably confining said filler within said central portion, said end plug being at least partially fabricated of a fusible material that melts when the core temperature exceeds a pre-selected minimum temperature to allow the filler to be discharged from said housing through said lower end, whereby the filler is contained within the tube when it is discharged from the housing in an emergency situation and it may be readily removed from the reactor subsequent to such a discharge by removing the tube from the reactor.

References Cited by the Examiner

UNITED STATES PATENTS

| | | | |
|---|---|---|---|
| 2,987,455 | 6/1961 | Huston | 176—22 |
| 3,088,903 | 5/1963 | Firth | 176—86 |
| 3,115,453 | 12/1963 | Paget et al. | 176—22 |

BENJAMIN R. PADGETT, *Acting Primary Examiner.*

CARL D. QUARFORTH, REUBEN EPSTEIN, *Examiners.*

M. R. DINNIN, *Assistant Examiner.*